(12) United States Patent
Wang et al.

(10) Patent No.: US 11,526,516 B2
(45) Date of Patent: Dec. 13, 2022

(54) METHOD, APPARATUS, DEVICE AND STORAGE MEDIUM FOR GENERATING AND PROCESSING A DISTRIBUTED GRAPH DATABASE

(71) Applicant: Vesoft. Inc, HangZhou (CN)

(72) Inventors: Chenguang Wang, HangZhou (CN); Yujue Wang, HangZhou (CN); Xiaomeng Ye, HangZhou (CN); Yiwei Wu, HangZhou (CN)

(73) Assignee: Vesoft. Inc, Hangzhou (CN)

( * ) Notice: Subject to any disclaimer, the term of this patent is extended or adjusted under 35 U.S.C. 154(b) by 0 days.

(21) Appl. No.: 17/363,028

(22) Filed: Jun. 30, 2021

(65) Prior Publication Data

US 2022/0067047 A1 Mar. 3, 2022

(30) Foreign Application Priority Data

Aug. 31, 2020 (CN) .......................... 202010899482.4
Sep. 1, 2020 (CN) .......................... 202010903248.4

(51) Int. Cl.
*G06F 16/23* (2019.01)
*G06F 16/2455* (2019.01)
*G06F 16/248* (2019.01)
*G06F 16/28* (2019.01)
*G06F 16/901* (2019.01)

(52) U.S. Cl.
CPC .... *G06F 16/24556* (2019.01); *G06F 16/2322* (2019.01); *G06F 16/248* (2019.01); *G06F 16/24552* (2019.01); *G06F 16/287* (2019.01); *G06F 16/9024* (2019.01)

(58) Field of Classification Search
CPC ........... G06F 16/24556; G06F 16/2322; G06F 16/24552; G06F 16/248; G06F 16/287; G06F 16/9024

See application file for complete search history.

(56) References Cited

U.S. PATENT DOCUMENTS

| 10,474,657 | B2 * | 11/2019 | Hoff | G06F 16/2282 |
| 2017/0364534 | A1 * | 12/2017 | Zhang | G06F 16/284 |
| 2018/0039709 | A1 * | 2/2018 | Chen | G06F 16/9024 |
| 2019/0026334 | A1 * | 1/2019 | Ma | G06F 16/9027 |
| 2021/0089452 | A1 * | 3/2021 | Peng | G06F 12/0891 |

* cited by examiner

*Primary Examiner* — Jorge A Casanova
(74) *Attorney, Agent, or Firm* — Bayramoglu Law Offices LLC

(57) ABSTRACT

A UUID generation method for a distributed graph database, and a data processing method and apparatus for the distributed graph database. The UUID generation method for the distributed graph database comprises the following steps: receiving a UUID generation request, wherein the UUID generation request comprises an input field and a partition number of the input field; calling a Murmur hash function to generate an initial UUID according to the input field and the partition number of the input field; querying whether a duplicate key value exists between the initial UUID and a historical UUID to obtain a query result; and obtaining a target UUID for storage according to the query result and the initial UUID.

13 Claims, 4 Drawing Sheets

| Key | | | | Value | | |
|---|---|---|---|---|---|---|
| Part Id(4) | Vertex Id(n) | Tag Id(4) | Version(8) | Property 1 | ... | Property N |

| Key | | | | | | Value | | |
|---|---|---|---|---|---|---|---|---|
| Part Id(4) | Src Id(n) | Edge Type(4) | Rank(4) | Dst Id(n) | Version(8) | Property 1 | ... | Property N |

METHOD, APPARATUS, DEVICE AND STORAGE MEDIUM FOR GENERATING AND PROCESSING A DISTRIBUTED GRAPH DATABASE

CROSS REFERENCE TO THE RELATED APPLICATIONS

This application is based upon and claims priority to Chinese Patent Applications No. 202010899482.4, filed on Aug. 31, 2020, and No. 202010903248.4, filed on Sep. 1, 2020; the entire contents of which are incorporated herein by reference.

TECHNICAL FIELD

The present invention relates to the technical field of databases, and more particularly, to a UUID generation method for a distributed graph database, and a data processing method, apparatus, device and storage medium for a distributed graph database.

BACKGROUND

With the rapid development of big data and artificial intelligence, a large-scale graph data model has been widely applied in the fields of recommendation systems, social networks, security protection and control, etc., and these applications technically depend on a distributed graph database.

The graph database usually takes the graph theory (Graph) in the data structure as the theoretical basis. The graph consists of two critical elements: a node (or vertex) and an attribute on the node, and a relationship (or edge) and an attribute on the relationship.

A universally unique identifier (UUID) is a 128-bit value that can be calculated by specific algorithms. The UUID is configured to enable all the elements in the distributed database to have unique identification information in the global scope, without necessarily specifying the identification information through the central control terminal.

The traditional database is usually implemented based on a stand-alone system, so the unique UUID is mainly based on the stand-alone system. When the UUID generation method is applied to multiple nodes, there may occur duplicate key values, which will limit the extension of the database. For the distributed database, database nodes typically need to rely on a global service increment to allocate UUID. If there is a global service malfunction, the UUID will not be generated.

In view of the above problems, there is no effective technical solution at present.

SUMMARY

The objectives of the embodiments of the present invention are to provide a UUID generation method for a distributed graph database, and a data processing method and apparatus for the distributed graph database, which can solve the problem of the duplicate key value of UUIDs.

According to a first aspect, an embodiment of the present invention provides a UUID generation method for a distributed graph database, including the following steps:

receiving a UUID generation request, wherein the UUID generation request includes an input field and a partition number of the input field;

calling a Murmur hash function to generate an initial UUID according to the input field and the partition number of the input field;

querying whether a duplicate key value exists between the initial UUID and a historical UUID to obtain a query result; and obtaining a target UUID for storage according to the query result and the initial UUID.

Optionally, in the UUID generation method for the distributed graph database according to an embodiment of the present invention, the step of obtaining the target UUID for storage according to the query result and the initial UUID includes:

if there exists a duplicate, obtaining preset parameter information, and splicing the preset parameter information with the initial UUID to generate the target UUID for storage; and otherwise, taking the initial UUID as the target UUID for storage.

Optionally, in the UUID generation method for the distributed graph database according to an embodiment of the present invention, the preset parameter information is information of a current timestamp.

Optionally, in the UUID generation method for the distributed graph database according to an embodiment of the present invention, the step of receiving the UUID generation request includes:

receiving the UUID generation request sent from a storage service client, wherein the UUID generation request includes a hash value of the input field and a partition identifier (ID) of the input field.

Optionally, in the UUID generation method for the distributed graph database according to an embodiment of the present invention, the step of receiving the UUID generation request includes:

receiving the UUID generation request sent from a storage service client by a query server, wherein the UUID generation request includes a hash value of the input field and a partition ID of the input field; and receiving the UUID generation request forwarded by the query server.

Optionally, in the UUID generation method for the distributed graph database according to an embodiment of the present invention, before the step of receiving the UUID generation request, the storage service client performs the following steps:

obtaining the input field;

calling a UUID generation function to perform a hash algorithm on the input field to generate the hash value of the input field; and obtaining the partition ID of the input field.

Optionally, in the UUID generation method for the distributed graph database according to an embodiment of the present invention, the step of obtaining the partition ID of the input field includes the following steps:

performing a modulo operation on a partition number of the distributed graph database according to the hash value of the input field to determine a partition to which the input field belongs;

obtaining a position of a primary copy of the partition to which the input field belongs according to pre-cached partition information of the distributed graph database; and generating the partition ID of the input field according to the position of the primary copy.

Optionally, in the UUID generation method for the distributed graph database according to an embodiment of the present invention, the step of splicing a current timestamp with the initial UUID to generate the target UUID for storage includes:

taking the initial UUID as a value of the former 64 bits and the current timestamp as a value of the latter 64 bits, and combining the value of the former 64 bits and the value of the latter 64 bits to generate the target UUID for storage.

Optionally, in the UUID generation method for the distributed graph database according to an embodiment of the present invention, the step of generating the target UUID for storage includes:

storing the UUID in the form of a key-value pair.

According to a second aspect, an embodiment of the present invention further provides a data processing method for a distributed graph database. The distributed graph database includes a calculation node and storage nodes. The method includes the following steps:

setting a UUID for each storage node according to any aforementioned method;

obtaining a write request of a user, and receiving and parsing the write request by the calculation node;

after the parsing is completed, calculating a UUID of write information corresponding to the write request by the calculation node, determining a storage node where the write information is located according to the UUID, and generating a storage command; and sending the storage command to the storage node by the calculation node, and storing the write information according to the storage command by the storage node.

Optionally, in the data processing method for the distributed graph database according to an embodiment of the present invention, the step of determining the storage node where the write information is located according to the UUID includes:

communicating periodically with a meta-information node by the calculation node, obtaining partition information corresponding to the UUID from the meta-information node, wherein the distributed graph database includes the meta-information node; and determining the storage node where the write information is located according to the partition information.

Optionally, in the data processing method for the distributed graph database according to an embodiment of the present invention, the step of storing the write information according to the storage command by the storage node includes:

partitioning the write information by the storage node, and then storing the write information in the storage node in a Key-Value format.

Optionally, in the data processing method for the distributed graph database according to an embodiment of the present invention, after the step of storing the write information according to the storage command by the storage node, the method includes:

obtaining a query instruction, and receiving and parsing the query instruction by the calculation node;

after a parsing is completed, calculating a UUID of query information corresponding to the query instruction by the calculation node, determining a storage node where the query information is located according to the UUID, and generating a query request;

sending the query request to the storage node by the calculation node, and extracting the query information according to the query request by the storage node, and returning the query information to the calculation node; and obtaining the query information corresponding to the query instruction by the calculation node, and then returning the query information to the user.

According to a third aspect, an embodiment of the present invention further provides a UUID generation apparatus for a distributed graph database, including a receiving module, a first generation module, a query module and a second generation module.

The receiving module is configured to receive a UUID generation request. The UUID generation request includes an input field and a partition number of the input field.

The first generation module is configured to call a Murmur hash function to generate an initial UUID according to the input field and the partition number of the input field.

The query module is configured to query whether a duplicate key value exists between the initial UUID and a historical UUID to obtain a query result.

The second generation module is configured to obtain a target UUID for storage according to the query result and the initial UUID.

According to a fourth aspect, an embodiment of the present invention further provides a data processing apparatus for a distributed graph database. The distributed graph database includes a calculation node and storage nodes. The apparatus includes a setting module, an acquisition module, a calculation module and a storage module.

The setting module is configured to set a UUID for each storage node according to any aforementioned method.

The acquisition module is configured to acquire a write request of a user, and the calculation node receives and parses the write request.

The calculation module is configured for the calculation node, after the parsing is completed, to calculate a UUID of write information corresponding to the write request, determine a storage node where the write information is located according to the UUID, and generate a storage command.

The storage module is configured for the calculation node to send the storage command to the storage node, and the storage node stores the write information according to the storage command.

According to a fifth aspect, an embodiment of the present invention further provides an electronic device, including a processor and a memory. A computer-readable instruction is stored in the memory, and the computer-readable instruction is executed by the processor to implement the steps of any aforementioned method.

According to a sixth aspect, an embodiment of the present invention further provides a storage medium, and a computer program is stored on the storage medium. The computer program is executed by a processor to implement the steps of any aforementioned method.

Other features and advantages of the present invention will be illustrated in the following description and will become apparent in part from the specification or through the implementation of the embodiments of the present invention. The objectives and other advantages of the present invention may be realized and obtained through the structure specified in the specification, claims, and drawings.

BRIEF DESCRIPTION OF THE DRAWINGS

In order to more clearly illustrate the technical solutions of the embodiments of the present invention, the drawings in the embodiments of the present invention will be briefly described below. It should be understood that the following drawings only show some embodiments of the present invention, and thus should not be regarded as a limitation to the scope of the present invention. For those skilled in the art, other relevant drawings may be obtained according to these drawings without creative effort.

DETAILED DESCRIPTION OF THE EMBODIMENTS

Figure 1:
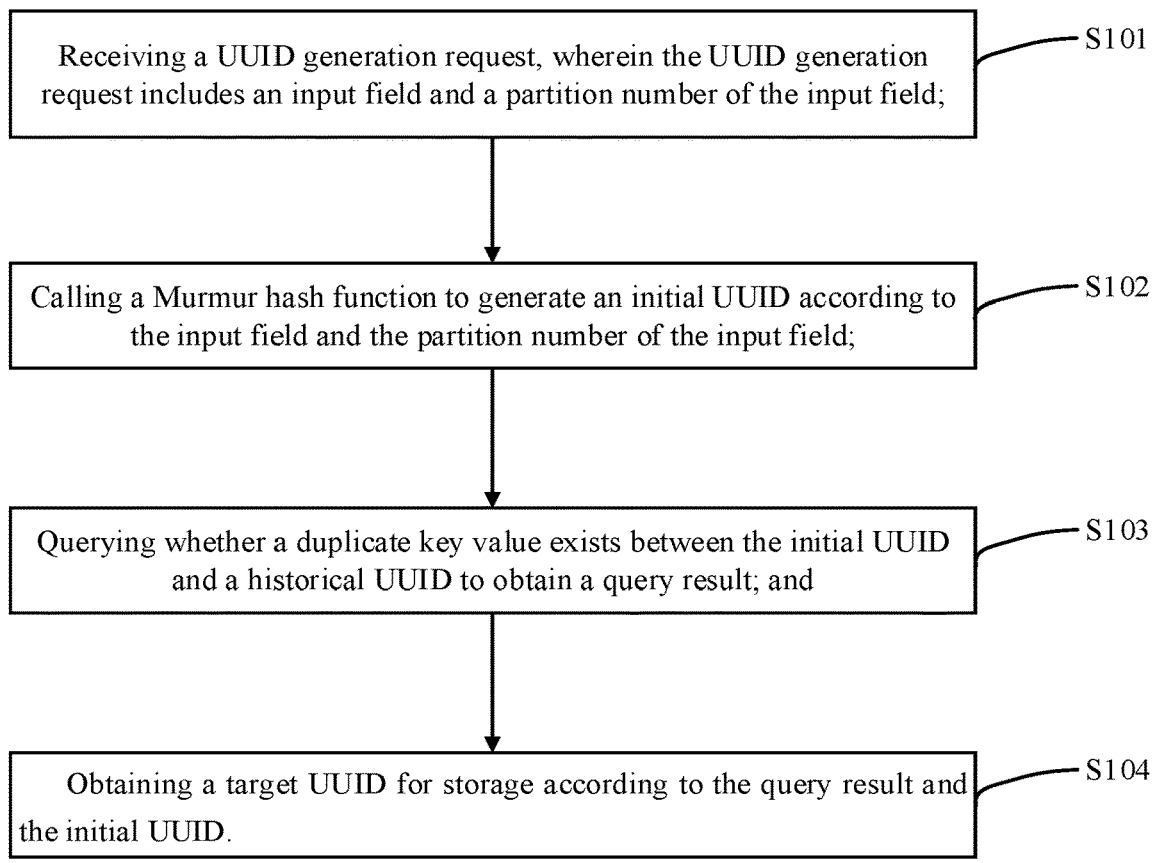
FIG. 1 is a flow chart of a UUID generation method for a distributed graph database according to an embodiment of the present invention.

The technical solutions in the embodiments of the present invention will be clearly and completely described below in combination with the drawings and the embodiments of the present invention. Obviously, the embodiments described are only part of the embodiments of the present invention, not all of them. The components of the embodiments of the present invention described and shown in the drawings here may be arranged and designed in a variety of different configurations. Therefore, the following detailed description of the embodiments of the present invention provided in the drawings is not intended to limit the scope of protection of the present invention, but merely represents the preferred embodiments of the present invention. Based on the embodiments of the present invention, all other embodiments obtained by those skilled in the art without creative effort shall fall within the scope of protection of the present invention.

It should be noted that similar tags and letters represent similar items in the drawings, so that once an item is defined in a drawing, it does not need to be further defined and explained in subsequent drawings. Meanwhile, in the description of the present invention, the terms "first" and "second" are only used to distinguish the description and cannot be considered to indicate or imply relative importance.

Referring to FIG. 1, FIG. 1 is a flow chart of a UUID generation method for a distributed graph database according to an embodiment of the present invention. The method aims to quickly generate unduplicated UUIDs and avoids key value conflicts among the UUIDs in the distributed graph database. A UUID generation method for a distributed graph database specifically includes the following steps.

S101: a UUID generation request is received. The UUID generation request includes an input field and a partition number of the input field.

S102: a Murmur hash function is called to generate an initial UUID according to the input field and the partition number of the input field.

S103: a query result is obtained by querying whether a duplicate key value exists between the initial UUID and a historical UUID.

S104: a target UUID is obtained for storage according to the query result and the initial UUID.

According to an embodiment of the present invention, the UUID generation method for the distributed graph database is applied to a storage server to provide data storage service for a client.

An embodiment of the present invention takes an open-source distributed database NebulaGraph as the graph database, and the present invention is implemented for the distributed database NebulaGraph to generate UUIDs. Other graph databases can also be used in other embodiments, and the selection of the specific graph database will not affect the implementation of the method of the present invention. Therefore, the graph database is not specifically limited herein.

In step S102, when the number of nodes in the distributed graph database reaches the level of a billion, UUIDs of elements directly generated by the hash function have a conflict probability. Therefore, to avoid the conflict of the UUIDs when there exist a large number of nodes in the distributed graph database, the values of the generated UUIDs are stored in the storage space by combining the Murmur hash function with a current timestamp (taking second as a unit). Each time a new UUID is generated, it is checked whether the value of the UUID duplicates (conflicts) with a historically generated UUID, that is, whether the value of the UUID exists in the storage space. If the value of the UUID exists in the storage space, the current timestamp is added behind the value generated by the Murmur hash function. In this way, the increasing time sequence of the current timestamp is used to enable the UUID generated by the combination to be unique and satisfy the characteristics of a universal identifier of an element. Moreover, the value generated by combining the current timestamp with the Murmur hash function is obtained to generate the UUID without an additional algorithm for recalculating the UUID, which can not only meet the need to get a unique value, but also improve the speed and efficiency of generation of the UUID.

Specifically, the Murmur hash function and its calculation process are common knowledge in the art, and the use of the Murmur hash function to calculate the value of the UUID is a general approach in the art. Thus, the process of calling the Murmur hash function to generate the UUID will not be repeatedly described herein.

In some embodiments, step S101 may include the following substeps.

S1011: the UUID generation request sent by a storage service client is received. The UUID generation request includes a hash value of the input field and a partition identifier (ID) of the input field.

S1012: the storage service client communicates with the storage server to obtain the UUID generated by the storage server, and the storage server executes a UUID generation process according to the UUID generation request initiated by the storage service client.

S1013: a getUUID method, namely a UUID generation function, is created in the storage service client, and is configured to send a request to the storage server and transmit parameters. In an embodiment of the present invention, the transmitted parameters are the hash value of the input field and the partition ID of the input field.

In some embodiments, step S101 may include the following substeps.

The UUID generation request sent by the storage service client is received by a query server. The UUID generation request includes the hash value of the input field and the partition ID of the input field. The UUID generation request forwarded by the query server is received. In an embodiment of the present invention, the UUID generation request and parameters sent by the storage service client are received by the query server, and the query server interacts with the storage server.

In order to complete the generation of UUID, a syntax parsing module in the query server, such as Yet Another Compiler-Compiler (yacc), is a classic tool for generating syntactic analyzers. The corresponding syntax of the UUID is added to the syntax parsing module, and the uuid_expression part is added to the parser.yy file, namely structured query language (SQL) syntax rule file, to convert a UUID generative syntax into a UUID expression. The UUID expression extends Nebula's expression system, and the getUUID method is called through the storage service client to generate the UUID. The return result type is a Future, representing the result of an asynchronous task that may not have been completed. The result returned by Future may be obtained by calling the get ( ) method. If the result of Future is Status (used to describe the returned status value, which is a logical value) or <cpp2::GetUUIDResp>, if there is an error in the result, then the ok ( ) method returns false. Otherwise, the UUID is generated successfully, and the generated UUID value may be obtained through the value ( ) method.

Preferably, step S101 may further include: obtaining the input field; calling the UUID generation function to perform a hash algorithm on the input field to generate the hash value of the input field; and obtaining the partition ID of the input field.

The getUUID method is called in the storage service client to perform the hash algorithm on the input field (parameter) by using a std::hash method according to the input field to generate the hash value (ID). The partition ID is obtained according to the partId method.

Preferably, in some embodiments, the step of obtaining the partition ID of the input field includes the following steps: performing a modulo operation on a partition number of the distributed graph database according to the hash value of the input field to determine a partition to which the input field belongs; obtaining a position of a primary copy of the partition to which the input field belongs according to the pre-cached partition information of the distributed graph database; and generating the partition ID of the input field according to the position of the primary copy.

In the getUUID method, the partition ID is determined according to the partId method as follows. Firstly, the partition number of the graph space of the specified distributed graph database is determined, and a modulo operation is performed on the partition of the graph space according to the hash value (ID) of the input field to determine the partition to which the input field belongs. According to the partition information cached in the storage service client, that is, the distribution information of each partition, the position of the primary copy of the partition is obtained and return values of the getUUID method are generated according to the above information. Finally, the return values (the hash value of the input field and the partition ID of the input field) are sent to the storage server via Storage Service Async Client to obtain the UUID.

In some embodiments, step S104 may include the following substeps.

S1041: if there exists a duplicate, preset parameter information is obtained, and the preset parameter information is spliced with the initial UUID to generate the target UUID for storage. S1042: otherwise, the initial UUID is taken as the target UUID for storage. The preset parameter information is information of a current timestamp. Certainly, the preset parameter information may also be a count value. For example, the preset parameter information is 100 when a first duplicate occurs, and the preset parameter information is 200 when a second duplicate occurs. Correspondingly, the spliced UUID is obtained through the combination by adding 200 behind the original UUID.

Further, the step of storing the initial UUID as a target UUID includes the following: taking the initial UUID as a value of the former 64 bits and the current timestamp as a value of the latter 64 bits, and combining the value of the former 64 bits and the value of the latter 64 bits to generate the target UUID for storage.

In an embodiment of the present invention, the Murmur hash function produces a 32-bit hash value, so the 32-bit hash value is used as the former 32 bits of the UUID, and the current timestamp is used as the latter 32 bits. The generated result, i.e. the target UUID, is stored in the underlying storage engine. The hash value of the hash function and the timestamp are combined to effectively avoid the hash value conflict of the UUID, and to enable the UUID generated by this method to be globally unique.

Further, in some embodiments, the step of generating the target UUID for storage includes the following: storing the UUID in the form of a key-value pair. The UUID is stored in the form of a key-value pair, so that when performing the duplicate checking on a newly generated UUID, it is determined whether the UUID exists by checking the key value of the key-value pair. If yes, it means that the newly generated UUID is duplicated with a historical UUID. The use of key-value pairs can increase the query efficiency.

Figure 2:
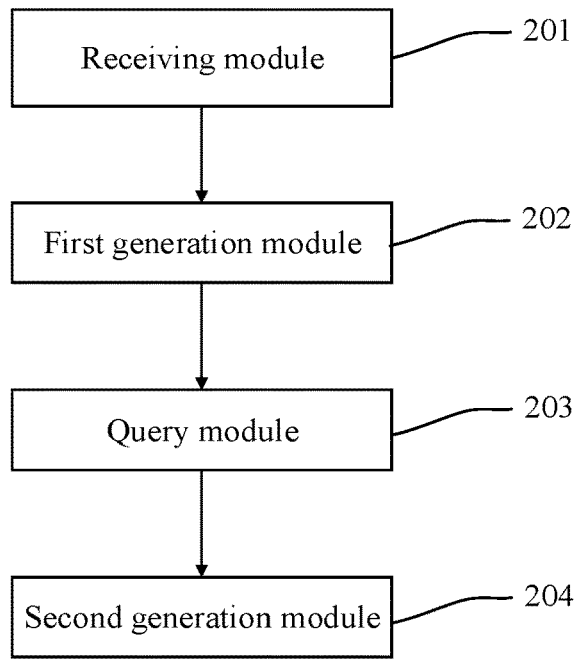
FIG. 2 is a block diagram of the structure of a UUID generation apparatus for a distributed graph database according to an embodiment of the present invention.

As shown in FIG. 2, FIG. 2 is a UUID generation apparatus for a distributed graph database according to some embodiments of the present invention. The apparatus includes the receiving module 201, the first generation module 202, the query module 203 and the second generation module 204.

The receiving module 201 is configured to receive a UUID generation request. The UUID generation request includes an input field and a partition number of the input field.

The first generation module 202 is configured to call a Murmur hash function to generate an initial UUID according to the input field and the partition number of the input field.

The query module 203 is configured to query whether a duplicate key value exists between the initial UUID and a historical UUID to obtain a query result.

The second generation module 204 is configured to obtain a target UUID for storage according to the query result and the initial UUID.

Figure 3:
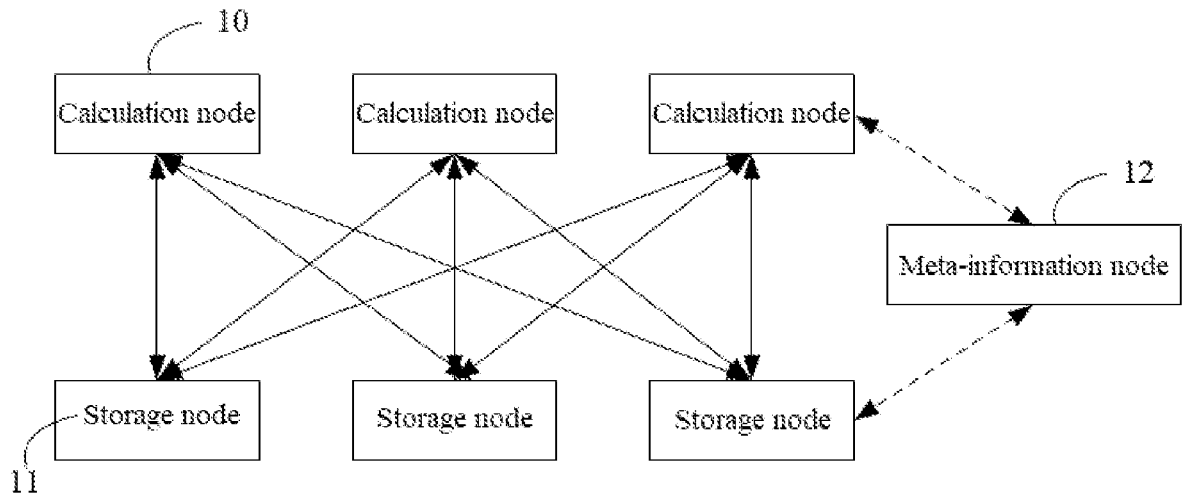
FIG. 3 is a schematic diagram of an application environment of a data processing method for a distributed graph database according to an embodiment of the present invention.

The present invention further provides a data processing method for a distributed graph database, which can be applied to the application environment shown in FIG. 3. FIG. 3 is a schematic diagram of the application environment of a data processing method for a distributed graph database according to an embodiment of the present invention. As shown in FIG. 3, the system of the application environment includes the calculation node 10 (GraphNode), the storage node 11 (StorageNode) and the meta-information node 12 (MetaNode). Specifically, the calculation node 10 obtains a write request of a user, and the calculation node 10 receives and parses the write request. After the parsing is completed, the calculation node 10 calculates a UUID of the write information corresponding to the write request. The calculation node 10 communicates periodically with the meta-information node 12, and obtains the partition information corresponding to the UUID from the meta-information node 12. The calculation node 10 determines the storage node 11 where the write information is located according to the partition information, and generates a storage command. The calculation node 10 sends the storage command to the storage node 11, and the storage node 11 stores the write information according to the storage command. In an embodiment of the present invention, the data processing method for the distributed graph database is employed to perform the partition processing on the data and store the data evenly in each storage node 11, thereby solving the problem that an enormous amount of data cannot be saved in the same storage node 11. Additionally, by means of a cluster load balancing mechanism, the storage node 11 is capable of expanding and reducing the capacity, so as to meet the requirements of millisecond-level query delay, high throughput and high concurrency of the stored data. Besides, it solves the problem of high delay of storing data and querying data in the prior graph database, and improves the query efficiency of the stored data and the performance of the server.

Figure 4:
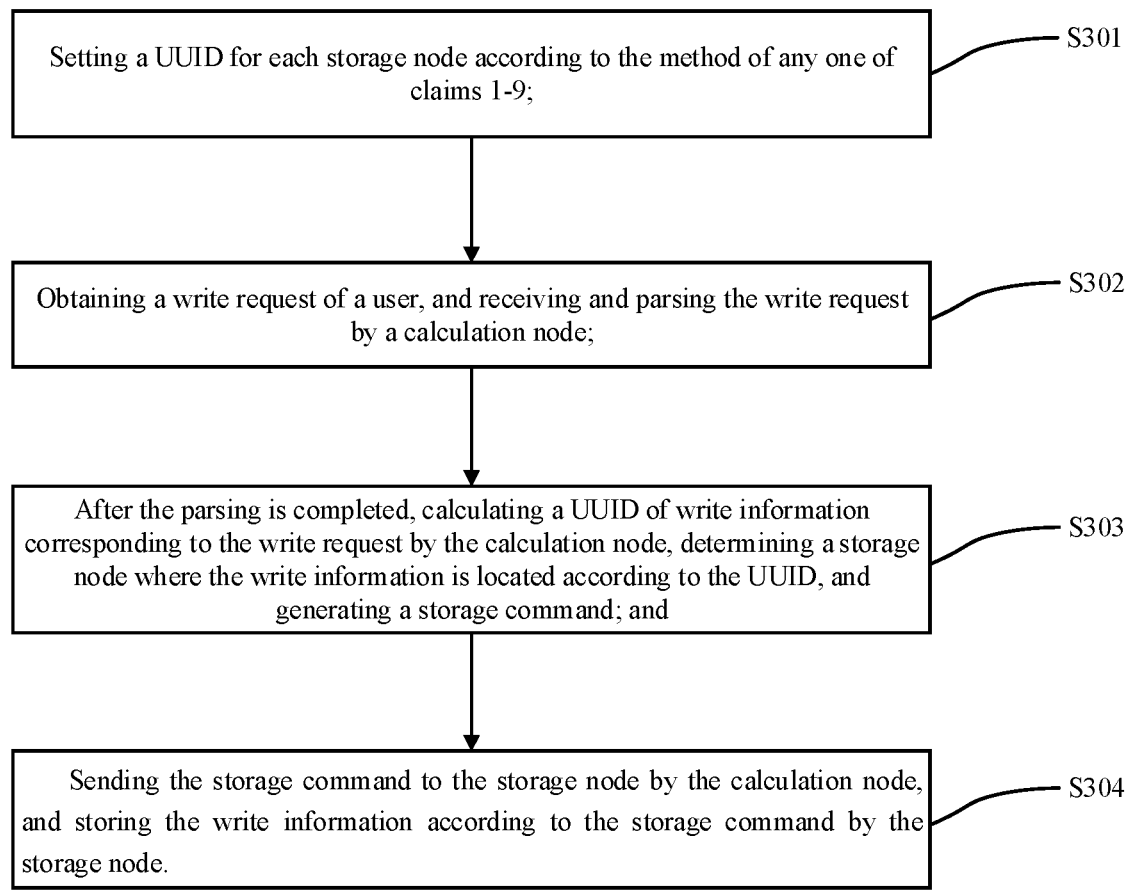
FIG. 4 is a flow chart of the data processing method for the distributed graph database according to an embodiment of the present invention.

FIG. 4 is a flow chart of the data processing method for the distributed graph database according to an embodiment of the present invention. As shown in FIG. 4, the data processing method for the distributed graph database includes the following steps.

Step S301: a UUID is set for each storage node according to the method described in any one of the above embodiments. Step S302: a write request of a user is obtained, and the calculation node 10 receives and parses the write request. Step S303: after the parsing is completed, the calculation node 10 calculates the UUID (PartId) of the write information corresponding to the write request, determines the storage node 11 where the write information is located according to the UUID, and generates a storage command. Step S304: the calculation node 10 sends the storage command to the storage node, and the storage node 11 stores the write information according to the storage command.

In step S301, the aforementioned UUID generation method for the distributed graph database can be adopted to set the UUID.

Figures 5, 6, 7:
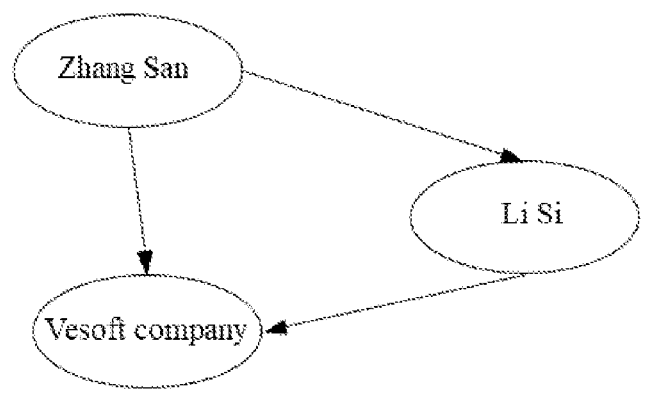
FIG. 5 is a schematic diagram of a node-edge relationship according to an embodiment of the present invention.
FIG. 6 is a schematic diagram of the Key-Value field storage format of a node according to an embodiment of the present invention.
FIG. 7 is a schematic diagram of the Key-Value field storage format of an edge according to an embodiment of the present invention.

In step S302, the calculation node 10 is a physical computing resource containing a central processing unit (CPU) and a memory, and has functions of data management, log management, configuration management, processing thread management, process communication management and transmission control protocol (TCP) communication management. The calculation node 10 is mainly used to receive tasks of a server, forward the tasks and calculate the results, and monitor whether the calculation module is normal, and so on. The write request is configured to write the information and attribute of a node or an edge. FIG. 5 is a schematic diagram of a node-edge relationship according to an embodiment of the present invention. As shown in FIG. 5, Zhang San is a node, and each node will have a unique tag. Zhang San has a person's tag, and the corresponding attribute is "age: 28" and "gender: male". Similarly, Company A has a company tag, and the corresponding attribute is "establishment time: 2018". Besides, an edge is written, for example, an edge existing between Zhang San and Li Si is a colleague, the corresponding attribute is "time: 3 years". Similarly, an edge existing between Zhang San and Vesoft company is employment, and the corresponding attribute is "time: 3 years". The write information in the above way enables the data to be relatively concise and clear, so as to improve the efficiency of the server. In addition, since the calculation node 10 itself does not store any information, it has good horizontal extension, can be extended infinitely horizontally, and can meet the requirements of high throughput of the stored data.

In step S303, the storage node 11 exists in the storage procedure, and has functions of data storage, data reproduction, data balance and data recovery. The storage node 11 is configured to store the data of nodes and edges, and return the corresponding data according to the request sent by the calculation node 10, e.g. returning the attributes of an edge, a node or all edges on a node. Additionally, the UUID is obtained by performing a hash function and a modular calculation on the name of the node. For example, the information of a node "Zhang San" is written, and the calculation node 10 performs the hash function and the modular calculation on the name of the node "Zhang San" to obtain the UUID corresponding to "Zhang San". In an embodiment of the present invention, the UUID of the node is used to find the storage node 11 where the write information is located, which can effectively improve the query efficiency of the stored data. Moreover, the partition way to store data improves the stability and load capacity of the system, and solves the problem that a large amount of data cannot be stored in the same storage node and the performance bottleneck problem of high concurrency.

In step S304, through the above steps S302 to S304, in order to solve the problems that a large amount of data cannot be saved in the same storage node and the query delay of the stored data is high in the prior art, an embodiment of the present invention adopts a data processing method for a distributed graph database. The calculation node 10 obtains a write request of a user, receives and parses the write request. After the parsing is completed, the calculation node 10 calculates a UUID of the write information corresponding to the write request, determines the storage node 11 where the write information is located according to the UUID, and generates a storage command. The calculation node 10 sends the storage command to the storage node 11, and the storage node 11 stores the write information according to the storage command. The above method performs the partition processing on the data and stores the data evenly in each storage node 11, thereby solving the problem that a large number of data cannot be saved in the same storage node 11. Additionally, by means of a cluster load balancing mechanism, the storage node 11 is capable of expanding and reducing the capacity, so as to meet the requirements of millisecond-level query delay, high throughput and high concurrency of the stored data. Besides, it solves the problem of high delay of storing data and querying data in the prior graph database, and improves the query efficiency of the stored data and the performance of the server.

In some embodiments, the calculation node 10 communicates periodically with the meta-information node 12, obtains the partition information corresponding to the UUID from the meta-information node 12, and determines the storage node 11 where the write information is located according to the partition information. The meta-information node 12 provides the maintenance, storage and management of the meta information to the whole system in the form of a cluster. Optionally, the meta information is divided into centralized management and distributed management. The centralized management means that one meta-information node 12 exists in the system to specialize in the management of the meta information, and all meta information is stored on the storage device of the node. Before requesting files, all clients must first request the meta information from the meta-information node 12. The distributed management means that the meta information is stored in any node of the system and can be migrated dynamically, and the responsibility for the management of the meta information is also distributed to different nodes. In addition, the meta-information node 12 holds the related information of the cluster, such as partition information, cluster state, etc., and also holds the pattern information of nodes and edges, such as ID and attribute information corresponding to tags. Optionally, both the calculation node 10 and the storage node 11 communicate periodically with the meta-information node 12 to obtain the latest cluster state and the latest pattern information. Through the way that the calculation node 10 communicates with the meta-information node 12 to obtain the partition information, the efficiency of querying data can be improved and the data information can be located accurately.

In some embodiments, the storage node 11 stores the write information according to the storage command, including as follows: the write information is partitioned by the storage node 11, and then is stored in the storage node 11 in a Key-Value format. Specifically, the Key-Value storage is a database that data in the form of a Key-Value pair is stored, and each Key corresponds to a unique value. FIG. 6 is a schematic diagram of the Key-Value field storage format of a node according to an embodiment of the present invention. As shown in FIG. 6, for example, the information of a node "Zhang San" is written, and the four fields stored in the Key are: UUID (PartId), the name of the node (VertexId), the tag ID (TagId) and the write time (Version) when this record is saved. Among them, the name of the node is "Zhang San", and the number of bytes occupied by the name of the node varies with the name of the node. The tag ID is an integer and occupies 4 bytes, which represents the ID corresponding to "Zhang San" used as the "person" tag, and this mapping relationship is saved on the meta-information node 12. The write time when this record is saved occupies 8 bytes. Value is used to store the corresponding attributes, for example, with respect to the record of "Zhang San" as "person", the two attributes, age and gender, are saved. FIG. 7 is a schematic diagram of the Key-Value field storage format of an edge according to an embodiment of the present invention. As shown in FIG. 7, for example, the information of an edge indicating that "Li Si" works in "Company A" is written, and the six fields stored in the Key are: UUID (PartId), the name of the start node (SrcId), the edge type (edgetype), the rank (Rank), the name of the destination node (DstId) and the write time (Version) when this record is saved. Among them, the name of the start node is "Li Si", the name of the destination node is "Company A", and the number of bytes occupied by the name of the node varies with the name of the node. The edge type is an integer and occupies 4 bytes, which represents the ID corresponding to the edge type of "works in", and this mapping relationship is saved on the meta-information node 12. The rank field records a time point, that is, the time point when "Li Si" joined "Company A", which occupies 4 bytes. The write time when this record is saved occupies 8 bytes. Value is used to store the corresponding attributes, for example, with respect to the record that "Li Si" works in "Company A", the attribute of time is saved. The Key-Value storage format ensures that all information of an entity is stored on the same storage node 11, so that the corresponding storage node 11 can be quickly calculated according to the UUID, and then the storage node 11 can obtain the corresponding attributes from the storage engine. In addition, different tags and edges of a node correspond to different keys, thus avoiding the problem that all records are stored on one record in the prior art such as JanusGraph. Moreover, the Key-Value storage format has the advantages of fast query speed, a large amount of data storage, supporting high concurrency, supporting horizontal extension of cluster mode, and supporting complex data structures such as hash, list, aggregation, ordered aggregation and so on.

In some embodiments, considering that the data processing flow of the distributed graph database includes not only the write information but also the query information of a user. In some embodiments, after the storage node 11 stores the write information according to the storage command, the calculation node 10 obtains a query instruction, and receives and parses the query instruction. After the parsing is completed, the calculation node 10 calculates a UUID of the query information corresponding to the query instruction, determines the storage node 11 where the query information is located according to the UUID, and generates a query request. The calculation node 10 sends the query request to the storage node 11, and the storage node 11 extracts the query information according to the query request and returns the query information to the calculation node 10. The calculation node 10 obtains the query information corresponding to the query instruction and then returns the query information to the user. Optionally, when the storage node 11 extracts the query information according to the query request and returns the query information to the calculation node 10, it is necessary to determine whether a record corresponding to the query information exists in the storage engine. If yes, the corresponding query information is returned, and if no, no result is returned. For example, the attribute of "time" is queried on the edge that "Zhang San" works in "Vesoft company", and it is then determined whether a corresponding record exists in the storage engine. If yes, the attribute of time on the edge is returned, and if no, no result is returned. Optionally, when the calculation node 10 returns the query information corresponding to the obtained query instruction to the user, the calculation node 10 may need to send a plurality of requests to the storage node 11 to obtain a complete result. For example, when querying friends of friends of "Zhang San", that is, when querying the second-level friend relationship, the calculation node 10 needs to first send a request to each storage node 11 that stores "Zhang San" to obtain the IDs of all friends of "Zhang San", i.e. the first-level friends. After the calculation node 10 receives the results, since more than one first-level friend of "Zhang San" may exist and be saved on a plurality of storage nodes 11, the calculation node 10 will again send a request to the storage nodes 11 that stores these first-level friends to obtain the friends of these first-level friends. Finally, after aggregation, the calculation node 10 obtains the friends of all friends of "Zhang San" and returns them to the user.

It should be noted that the steps shown in the above process or in the flow chart of the drawings may be performed in a computer system including a set of computer-executable instructions. Although a logical order is shown in the flow chart, in some cases, the steps shown or described can be performed in a different order from the present order.

The present invention is described below in detail in combination with the application scene.

An objective of the present invention is to provide a data processing system for a distributed graph database. In some embodiments, taking the query of the working years of "Zhang San" and "Li Si" in the "Vesoft company" as an example, the process steps of the technical solution of the data processing of the distributed graph database according to an embodiment of the present invention include the following.

After the user sends a query command to the calculation node 10, the calculation node 10 parses the corresponding command, and then calculates the PartId of "Zhang San" and "Li Si" respectively according to the start nodes of the two edges to be queried. Since the calculation node 10 periodically obtains the partition information from the meta-information node 12, it can be determined which storage node 11 the relevant records of "Zhang San" and "Li Si" are stored in according to the PartId. The calculation node 10 may simultaneously initiate a request to one or more storage nodes 11 according to the PartId, and require the storage node 11 to take out the attribute of time on the edge of working in the storage node 11 according to the query command of the user.

After the storage node 11 receives the corresponding request, the storage node 11 parses out the key that needs to be queried, e.g. parsing the attribute of "time" on the edge of the "Vesoft company" where "Zhang San" works, and then the storage node 11 determines whether a corresponding record exists in the storage engine. If yes, the attribute of time on the edge is returned, and if no, no result is returned.

When the calculation node 10 obtains all the results corresponding to the previous request, the calculation node 10 aggregates the results and returns them to the user.

It should be noted that the calculation node 10 may need to send a plurality of requests to the storage node 11 to obtain a complete result. For example, when querying friends of friends of "Zhang San", that is, when querying the second-level friend relationship, the calculation node 10 needs to first send a request to the storage node 11 that stores "Zhang San" to obtain the IDs of all friends of "Zhang San", i.e. the first-level friends. After the calculation node 10 receives the results, since more than one first-level friend of "Zhang San" may exist and be saved on a plurality of storage nodes 11, the calculation node 10 will again send a request to each storage node 11 that stores these first-level friends to obtain the friends of these first-level friends. Finally, after aggregation, the calculation node 10 obtains the friends of all friends of "Zhang San" and returns them to the user.

The above system meets the requirements of millisecond-level query delay, high throughput and high concurrency of the stored data, solves the problem of high delay of storing data and querying data in the prior graph database, and improves the query efficiency of the stored data and the performance of the server.

Figure 9:
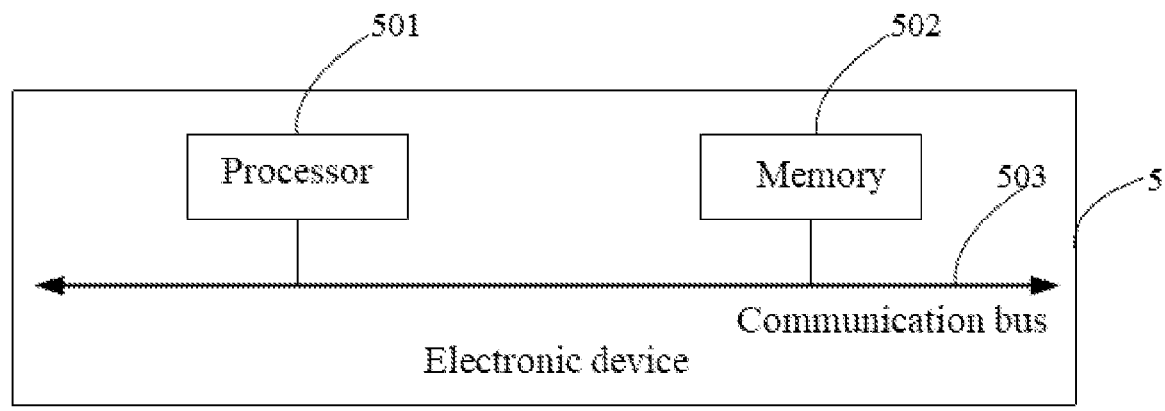
FIG. 9 is a schematic diagram of the internal structure of an electronic device according to an embodiment of the present invention.

In some embodiments, FIG. 9 is a schematic diagram of the internal structure of an electronic device according to an embodiment of the present invention. As shown in FIG. 9, the present invention provides an electronic device. The electronic device may be a server, and its internal structure is shown in FIG. 9. The electronic device includes a processor, a memory, a network interface and a database, which are connected through a system bus. Specifically, the processor of the electronic device is configured to provide computing and control capabilities. The memory of the electronic device includes a non-volatile storage medium and an internal memory. An operating system, a computer program and a database are stored in the non-volatile storage medium. The internal memory provides an environment for the operation of the operating system and the computer program in the non-volatile storage medium. The database of the electronic device is configured to store data. The network interface of the electronic device is configured to communicate with an external terminal through a network connection. The computer program is executed by the processor to implement a data processing method for a distributed graph database.

Those skilled in the art can understand that the structure shown in FIG. 9 is only a block diagram of part of the structure related to the technical solution of the present invention and does not constitute a limitation on the electronic device to which the technical solution of the present invention is applied. Specific electronic devices may include more or fewer components than those shown in the diagram, or assemble some components, or have different component arrangements.

Figure 8:
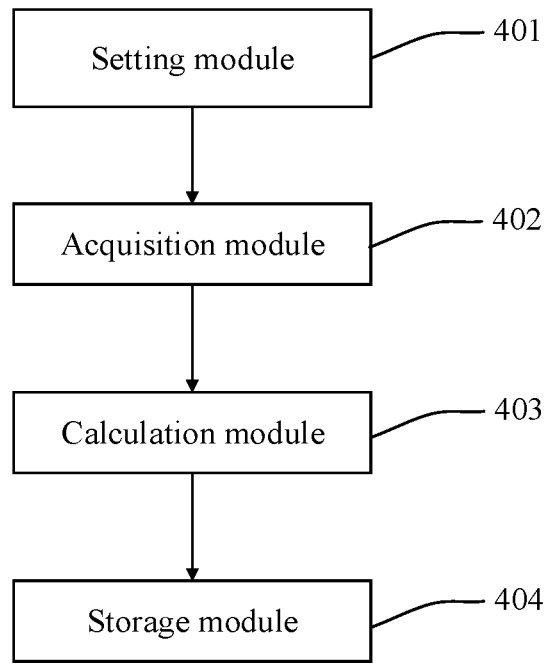
FIG. 8 is a schematic diagram of a data processing system for a distributed graph database according to an embodiment of the present invention.

As shown in FIG. 8, FIG. 8 shows a data processing apparatus for a distributed graph database. The distributed graph database includes a calculation node and a storage node. The device includes the setting module 401, the acquisition module 402, the calculation module 403 and the storage module 404.

Specifically, the setting module 401 is configured to set a UUID for each storage node according to the method described in any one of the above embodiments. The acquisition module 402 is configured to obtain a write request of a user, and the calculation node receives and parses the write request. The calculation module 403 is configured for the calculation node, after the parsing is completed, to calculate the UUID of the write information corresponding to the write request, determine the storage node where the write information is located according to the UUID, and generate a storage command. The storage module 404 is configured for the calculation node 10 to send the storage command to the storage node, and the storage node stores the write information according to the storage command.

Referring to FIG. 9, FIG. 9 is a schematic diagram of the structure of an electronic device according to an embodiment of the present invention. The present invention provides the electronic device 5, including the processor 501 and the memory 502. The processor 501 and the memory 502 are interconnected and communicate with each other through the communication bus 503 and/or other forms of connection mechanism (not marked), and a computer program executed by the processor 501 is stored in the memory 502. When the electronic device runs, the processor 501 executes the computer program to execute the data processing method for the distributed graph database in any optional implementation of the above embodiments, or implement the UUID generation method for the distributed graph database in the above embodiments.

An embodiment of the present invention provides a storage medium. When the computer program is executed by the processor, the storage medium executes the data processing method for the distributed graph database in any optional implementation of the above embodiments, or implement the UUID generation method for the distributed graph database in the above embodiments. The storage medium can be implemented by any type of a volatile storage device, a non-volatile storage device or a combination of them, such as static random access memory (SRAM), electrically erasable programmable read-only memory (EEPROM), programmable read-only memory (PROM), read-only memory (ROM), magnetic memory, flash memory, magnetic disk or compact disc.

In the embodiments provided in the present invention, it should be understood that the disclosed apparatus and method may be realized in other ways. The embodiments of the apparatus described above are only schematic. For example, the division of the units is only based on one logical functional division, and there may be another division in actual implementation. For example, multiple units or components may be combined or integrated into another system, or some features may be ignored or not executed. On the other hand, the mutual coupling or direct coupling or communication connection shown or discussed may be indirect coupling or communication connection via some communication interfaces, devices or units, which may be electrical, mechanical or in other forms.

In addition, the unit described as a separated unit may or may not be physically separate. The component displayed as a unit may or may not be a physical unit, that is, it may be located in one position, or it may be distributed to multiple network elements. Some or all of the units may be selected according to the actual needs to achieve the objectives of the technical solutions of the embodiments.

Furthermore, all functional modules in all the embodiments of the present invention may be integrated together to form a separate part, or each module may exist separately, or two or more modules may be integrated to form a separate part.

In this specification, relational terms such as "first" and "second" are used only to distinguish one entity or operation from another entity or operation, without necessarily requiring or implying that any such relationship or order actually exists between these entities or operations.

The above only describes the embodiments of the present invention, and the embodiments are not used to limit the scope of protection of the present invention. For those skilled in the art, various amendments and changes may be made to the present invention. Any modifications, equivalent replacements, improvements and others made within the spirit and principles of the present invention shall fall within the scope of protection of the present invention.

What is claimed is:

1. A UUID generation method for a distributed graph database, comprising the following steps:
receiving a UUID generation request, wherein the UUID generation request comprises an input field and a partition number of the input field;
calling a Murmur hash function to generate an initial UUID according to the input field and the partition number of the input field;
querying whether a duplicate key value exists between the initial UUID and a historical UUID to obtain a query result;
obtaining a target UUID for storage according to the query result and the initial UUID;
obtaining a write request of a user, and receiving and parsing the write request by the calculation node;
after the write request is parsed, calculating a UUID of write information corresponding to the write request by the calculation node, determining a first storage node according to the UUID of the write information, wherein the write information is located on the first storage node, and generating a storage command, wherein the storage command further comprises:

obtaining a query instruction, and receiving and parsing the query instruction by the calculation node;
after the query instruction is parsed, calculating a UUID of query information corresponding to the query instruction by the calculation node, determining a second storage node according to the UUID of the query information, wherein the query information is located on the second storage node, and generating a query request;
sending the query request to the second storage node by the calculation node, and extracting the query information according to the query request by the second storage node, and returning the query information to the calculation node;
obtaining the query information corresponding to the query instruction by the calculation node, and then returning the query information to the user; and
sending the storage command to the first storage node by the calculation node, and storing the write information according to the storage command by the first storage node.

2. The UUID generation method for the distributed graph database of claim 1, wherein, the step of obtaining the target UUID for storage according to the query result and the initial UUID comprises:
if there exists a duplicate, obtaining preset parameter information, and splicing the preset parameter information with the initial UUID to generate the target UUID for storage; and
otherwise, taking the initial UUID as the target UUID for storage.

3. The UUID generation method for the distributed graph database of claim 2, wherein, the preset parameter information is information of a current timestamp.

4. The UUID generation method for the distributed graph database of claim 2, wherein, the step of splicing a current timestamp with the initial UUID to generate the target UUID for storage comprises:
taking the initial UUID as a value of former 64 bits and the current timestamp as a value of latter 64 bits, and combining the value of the former 64 bits and the value of the latter 64 bits to generate the target UUID for storage.

5. The UUID generation method for the distributed graph database of claim 2, wherein, the step of generating the target UUID for storage comprises:
storing the target UUID in a form of a key-value pair.

6. The UUID generation method for the distributed graph database of claim 1, wherein, the step of receiving the UUID generation request comprises:
receiving the UUID generation request sent from a storage service client, wherein the UUID generation request comprises a hash value of the input field and a partition identifier (ID) of the input field.

7. The UUID generation method for the distributed graph database of claim 1, wherein, the step of receiving the UUID generation request comprises:
receiving the UUID generation request sent from a storage service client by a query server, wherein the UUID generation request comprises a hash value of the input field and a partition identifier (ID) of the input field; and
receiving the UUID generation request forwarded by the query server.

8. The UUID generation method for the distributed graph database of claim 7, wherein, before the step of receiving the UUID generation request, the storage service client performs the following steps:

obtaining the input field;
calling a UUID generation function to perform a hash algorithm on the input field to generate the hash value of the input field; and
obtaining the partition ID of the input field.

9. The UUID generation method for the distributed graph database of claim 8, wherein, the step of obtaining the partition ID of the input field comprises the following steps:
performing a modulo operation on a partition number of the distributed graph database according to the hash value of the input field to determine a partition, wherein the input field belongs to the partition;
obtaining a position of a primary copy of the partition according to pre-cached partition information of the distributed graph database; and
generating the partition ID of the input field according to the position of the primary copy.

10. A data processing method for a distributed graph database, wherein the distributed graph database comprises a calculation node and storage nodes, the data processing method comprises the following steps:
setting a UUID for each storage node according to:
receiving a UUID generation request, wherein the UUID generation request comprises an input field and a partition number of the input field;
calling a Murmur hash function to generate an initial UUID according to the input field and the partition number of the input field;
querying whether a duplicate key value exists between the initial UUID and a historical UUID to obtain a query result;
obtaining a target UUID for storage according to the query result and the initial UUID;
obtaining a write request of a user, and receiving and parsing the write request by the calculation node;
after the write request is parsed, calculating a UUID of write information corresponding to the write request by the calculation node, determining a first storage node according to the UUID of the write information, wherein the write information is located on the first storage node, and generating a storage command, wherein the storage command further comprises:
obtaining a query instruction, and receiving and parsing the query instruction by the calculation node;
after the query instruction is parsed, calculating a UUID of query information corresponding to the query instruction by the calculation node, determining a second storage node according to the UUID of the query information, wherein the query information is located on the second storage node, and generating a query request;
sending the query request to the second storage node by the calculation node, and extracting the query information according to the query request by the second storage node, and returning the query information to the calculation node;
obtaining the query information corresponding to the query instruction by the calculation node, and then returning the query information to the user; and
sending the storage command to the first storage node by the calculation node, and storing the write information according to the storage command by the first storage node.

11. The data processing method of claim 10, wherein the step of determining the first storage node according to the UUID of the write information comprises:
communicating periodically with a meta-information node by the calculation node, obtaining partition information corresponding to the UUID of the write information from the meta-information node, wherein the distributed graph database comprises the meta-information node; and determining the first storage node according to the partition information.

12. The data processing method of claim 10, wherein the step of storing the write information according to the storage command by the first storage node comprises:
partitioning the write information by the first storage node, and then storing the write information in the first storage node in a Key-Value format.

13. A UUID generation apparatus for a distributed graph database, comprising:
a processor coupled to a memory storing instructions to:
receive a UUID generation request, wherein the UUID generation request comprises an input field and a partition number of the input field;
call a Murmur hash function to generate an initial UUID according to the input field and the partition number of the input field;
query whether a duplicate key value exists between the initial UUID and a historical UUID to obtain a query result;
obtain a target UUID for storage according to the query result and the initial UUID;
obtain a write request of a user, and receiving and parsing the write request by the calculation node;
after the write request is parsed, calculate a UUID of write information corresponding to the write request by the calculation node, determine a first storage node according to the UUID of the write information, wherein the write information is located on the first storage node, and generate a storage command, wherein the storage command further comprises:
obtain a query instruction, and receiving and parsing the query instruction by the calculation node;
after the query instruction is parsed, calculate a UUID of query information corresponding to the query instruction by the calculation node, determining a second storage node according to the UUID of the query information, wherein the query information is located on the second storage node, and generate a query request;
send the query request to the second storage node by the calculation node, and extract the query information according to the query request by the second storage node, and return the query information to the calculation node;
obtain the query information corresponding to the query instruction by the calculation node, and then return the query information to the user; and
send the storage command to the first storage node by the calculation node, and store the write information according to the storage command by the first storage node.

* * * * *